(12) United States Patent
Shitomi

(10) Patent No.: US 7,930,498 B2
(45) Date of Patent: *Apr. 19, 2011

(54) METHOD FOR REPLICATING SNAPSHOT VOLUMES BETWEEN STORAGE SYSTEMS

(75) Inventor: Hidehisa Shitomi, Mountain View, CA (US)

(73) Assignee: Hitachi, Ltd., Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 12/155,784

(22) Filed: Jun. 10, 2008

(65) Prior Publication Data

US 2008/0250215 A1    Oct. 9, 2008

Related U.S. Application Data

(63) Continuation of application No. 11/107,904, filed on Apr. 18, 2005, now Pat. No. 7,404,051.

(51) Int. Cl.
*G06F 13/00* (2006.01)
(52) U.S. Cl. .................... 711/162; 711/E12.103
(58) Field of Classification Search ............. None
See application file for complete search history.

(56) References Cited

U.S. PATENT DOCUMENTS

| | | | |
|---|---|---|---|
| 4,679,153 A * | 7/1987 | Robinson et al. ............. 345/468 |
| 5,649,152 A | 7/1997 | Ohran et al. |
| 6,131,148 A | 10/2000 | West et al. |
| 6,408,370 B2 | 6/2002 | Yamamoto et al. |
| 6,529,976 B1 | 3/2003 | Fukuzawa et al. |
| 6,779,095 B2 * | 8/2004 | Selkirk et al. ................. 711/165 |
| 6,898,681 B2 * | 5/2005 | Young ............................ 711/162 |
| 7,007,046 B2 | 2/2006 | Manley et al. |
| 7,039,663 B1 | 5/2006 | Federwisch et al. |
| 7,043,485 B2 | 5/2006 | Manley et al. |
| 7,237,076 B2 | 6/2007 | Nakano et al. |
| 7,287,045 B2 | 10/2007 | Saika et al. |
| 2003/0005248 A1* | 1/2003 | Selkirk et al. ................. 711/165 |
| 2003/0135704 A1* | 7/2003 | Martin ........................ 711/162 |
| 2004/0010732 A1* | 1/2004 | Oka ............................... 714/13 |
| 2004/0093361 A1 | 5/2004 | Therrien et al. |
| 2004/0128443 A1* | 7/2004 | Kaneda et al. ............... 711/114 |
| 2004/0133575 A1* | 7/2004 | Farmer et al. ..................... 707/9 |
| 2004/0267836 A1 | 12/2004 | Armangau et al. |
| 2005/0015663 A1 | 1/2005 | Armangau et al. |

* cited by examiner

*Primary Examiner* — Matt Kim
*Assistant Examiner* — John P Fishburn
(74) *Attorney, Agent, or Firm* — Mattingly & Malur, P.C.

(57) ABSTRACT

An apparatus, system, and method for replicating a snapshot volume in a first storage system to a second storage system includes mapping information corresponding to data in the first storage system that is transferred from the first storage system to the second storage system so that a file system in the second storage system can mount the data after replication. Replication of the snapshot volume can be accomplished using a remote copy mechanism. The snapshot volume can be obtained from a primary source volume P-VOL and a differential source volume D-VOL. If the corresponding destination volumes are not known, a search is conducted to locate appropriate volumes in the second storage system. Mapping information regarding these destination volumes is utilized to enable the file system in the second storage system to mount the replicated snapshot volume.

19 Claims, 17 Drawing Sheets

| LUN | Type | Size | Used |
|---|---|---|---|
| LU1 | OPEN-3 | 1TB | Y |
| LU2 | OPEN-9 | 500GB | N |

US 7,930,498 B2

METHOD FOR REPLICATING SNAPSHOT VOLUMES BETWEEN STORAGE SYSTEMS

This is a continuation application of U.S. Ser. No. 11/107,904, filed Apr. 18, 2005 now U.S. Pat. No. 7,404,051.

BACKGROUND OF THE INVENTION

1. Field of the Invention

The invention relates generally to storage systems. More specifically, the invention relates to making a replica of a snapshot image in a remote network attached storage (NAS) system, and to enabling a remote NAS system to mount the snapshot image after making the replica of the snapshot image.

2. Description of the Related Art

Generally speaking, there are two major storage system types: SAN (Storage Area Network) and NAS (Network Attached Storage). SAN employs block level access to data in its storage system, while file level access is used in NAS.

"Snapshot" is a mechanism for taking a point in time (PIT) copy of a file system in the NAS system. There are various ways of implementing the snapshot mechanism. Copy on write (COW) is one of the most popular implementations in the NAS system.

"Remote Copy" is a mechanism for creating a volume pair between two separate storage systems. One main purpose of remote copy is to prepare for catastrophic events or disasters, and to enable disaster recovery (DR). Although the NAS system is a file level storage system, it can collaborate with the remote copy mechanism in a disk array storage system residing in the backend of the NAS system.

It is possible to use both the snapshot mechanism and the remote copy mechanism at the same time. More specifically, the snapshot image can be copied by using remote copy operations. However, in the prior art, it is not possible for a local file system of a remote NAS system to mount the copied snapshot image because the snapshot module in the remote NAS system does not have sufficient information regarding logical units corresponding the snapshot image.

Examples of prior art patents include: "Method and System for Providing a Static Snapshot of Data Stored on a Mass Storage System", Richard S. Ohrann et al, U.S. Pat. No. 5,649,152; "Storage System Assuring Data Integrity and A Synchronous Remote Data Duplexing", Akira Yamamoto, U.S. Pat. No. 6,408,370; and "Heterogeneous Computer System, Heterogeneous Input Output System and Data Backup Method for the Systems", Yasuko Fukuzawa et al, U.S. Pat. No. 6,529,976. The entire disclosures of all of these patents are hereby incorporated by reference.

BRIEF SUMMARY OF THE INVENTION

An object of the invention is to create a replica of a snapshot image in a remote NAS system, and also to enable the remote NAS system to mount the snapshot image. To realize this object of the present invention, according to one embodiment, snapshot replication commands are prepared. Furthermore, the logical unit information for the snapshot image can be provided to the remote NAS system.

The method of replicating a snapshot volume in a first storage system to a second storage system, includes the steps of: providing a primary volume (P-VOL), which represents data existing in a first storage system; providing a differential volume (D-VOL) containing information regarding a change in data of the primary volume, the differential volume being used for recreating the data of the primary volume at random or predetermined points in time; storing mapping information of P-VOL and D-VOL in a first snapshot volume management table (SVMT); designating a target volume in the second storage system; storing transfer information in a table in the first storage system, the transfer information including the mapping information of P-VOL and D-VOL and information of a target volume in the second storage system in a table; commencing replication of the P-VOL and D-VOL from the first storage system to the second storage system; and sending the transfer information to the second storage system.

The method further includes the steps of: creating a snapshot image logical volume (V-VOL) from P-VOL and D-VOL; and after replicating P-VOL and D-VOL to the second storage system, creating a replicated snapshot image logical volume (V'-VOL), wherein V-VOL is accessible by a first host and V'-VOL is accessible by a second host.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views.

1st Embodiment

Figure 1:
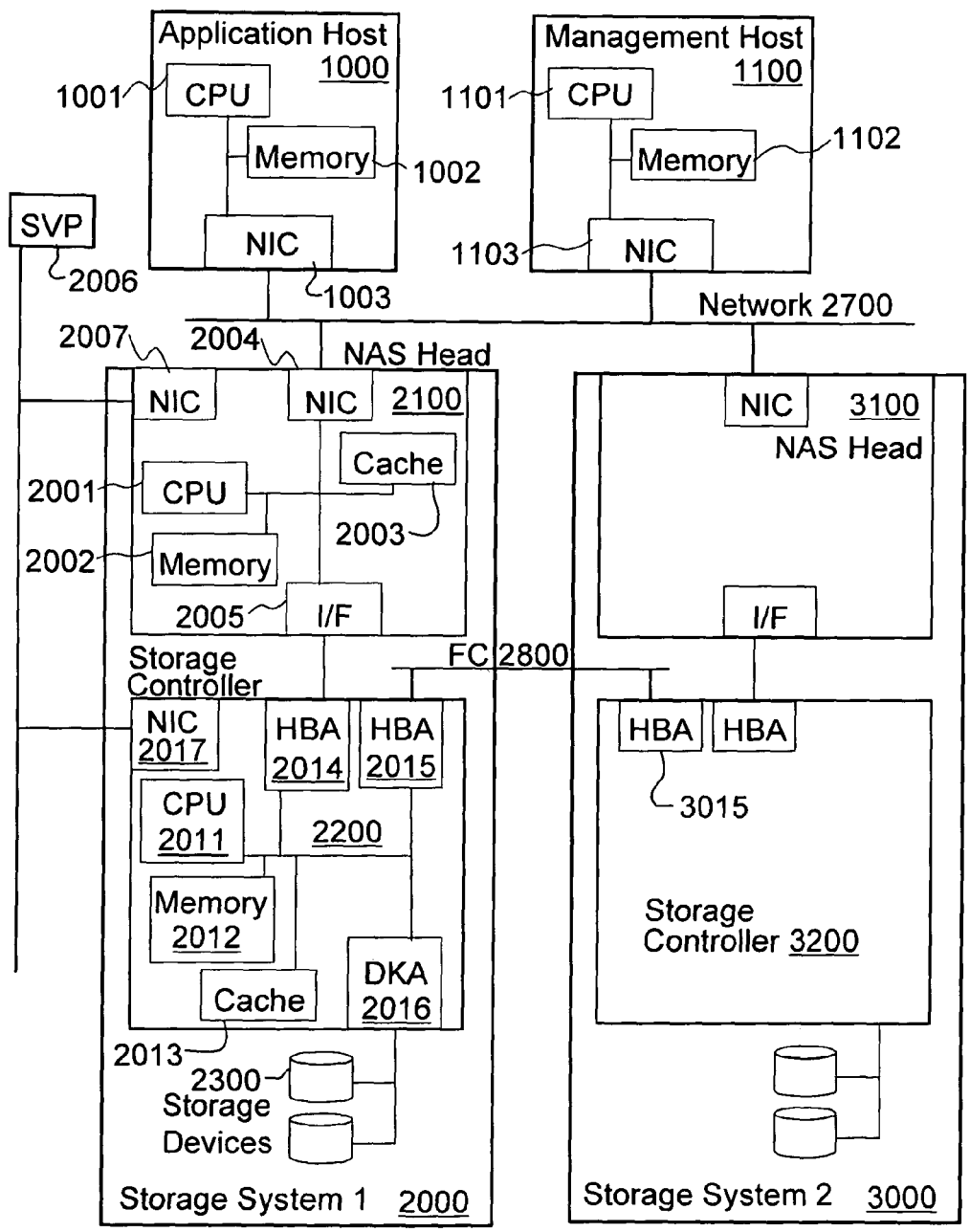
FIG. 1 illustrates an example of hardware configuration of the invention according to one embodiment.

FIG. 1 shows an example of a hardware configuration in which the method and apparatus of this invention are applied according to a first embodiment. The system includes an Application Host 1000, a Storage Management Host 1100, and Storage Systems 2000 and 3000.

Figure 2:
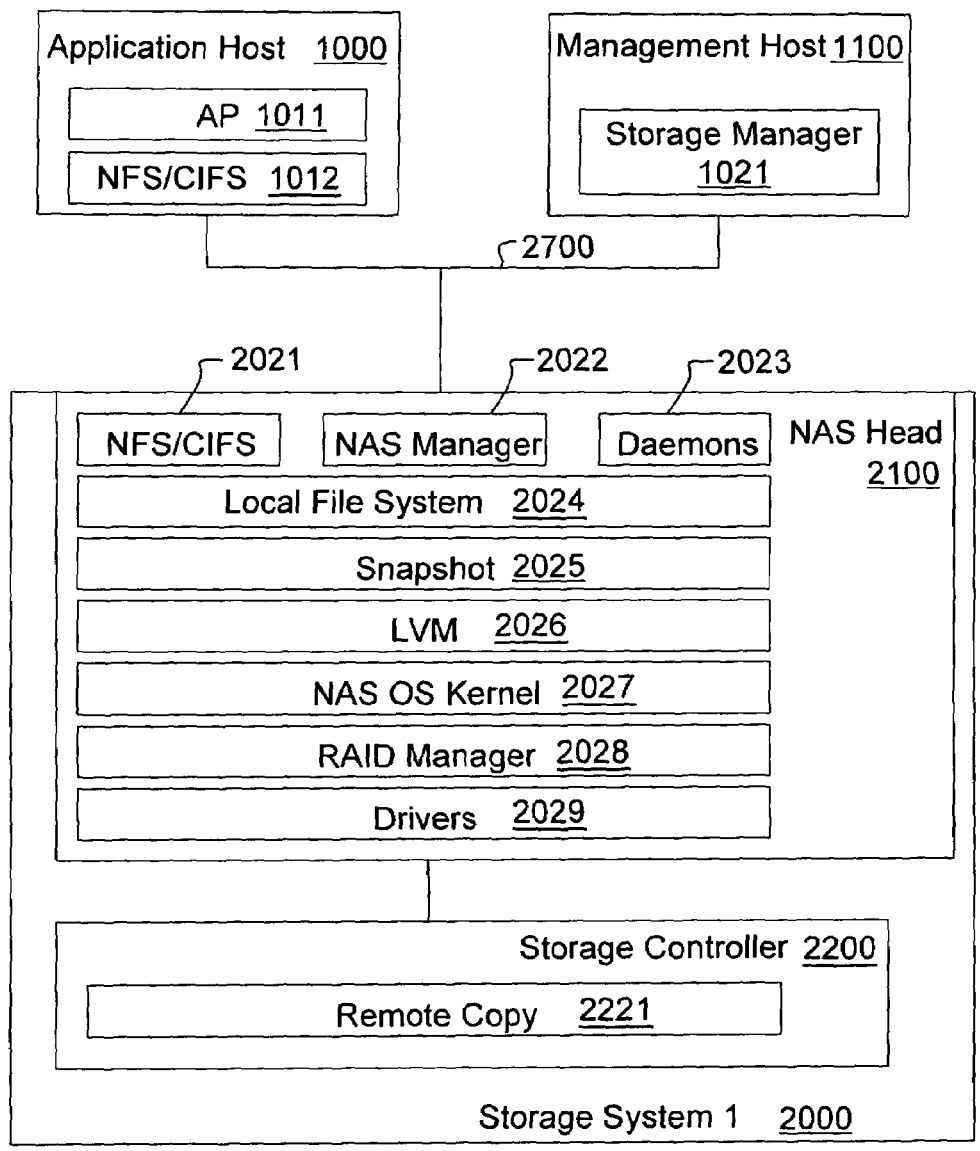
FIG. 2 illustrates an example of a software configuration in which the method and apparatus of this invention are applied.

Application Host 1000 includes a memory 1002 and a CPU 1011 for running an Application System Software (AP) 1011 (illustrated in FIG. 2). The Application System 1011 on the Application Host 1000 issues input/output (I/O) operations to the Storage System 2000, as will be described in more detail below. The Application Host 1000 is connected to the Storage System 2000 via a network interface connection (NIC) 1003. Additional connections to the Storage System 2000 may exist. Moreover, the Application Host 1000 may also be connected to Storage System 3000.

Storage Management Host 1100 includes a memory 1102 and a CPU 1101 for running a Storage Management Software 1021 (illustrated in FIG. 2). The Storage Management Software 1021 issues I/O operations to the Storage System 2000, as will be described in more detail below. The Storage Management Host is connected to the Storage System 2000 via NIC 1103 and a network 2700. Additional connections to the Storage System 2000 may exist. Moreover, Storage Management Host 1100 may also be connected to the Storage System 3000 via network 2700.

Storage System 2000 includes two primary portions: a NAS Head 2100 and a Storage Controller 2200 (hereinafter referred to as controller 2200). NAS Head 2100 and controller 2200 can be connected via a network interface and can exist in a single storage unit. In such a case, they are interconnected via a system bus. On the other hand, the NAS Head 2100 and controller 2200 can be physically separated, in which case, they are interconnected via network connections such as Fiber Channel, Ethernet, etc.

The NAS Head 2100 includes a CPU 2001, a memory 2002, a cache memory 2003, a network interface (NIC) 2004, a disk interface (I/F) 2005, and a management interface (NIC) 2007. NAS Head 2100 processes I/O requests from the Application Host 1000 and Storage Management Host 1100. A program for processing I/O requests or other operations is stored in memory 2002, and CPU 2001 executes this program. Cache memory 2003 stores the write data from host computer 1000 temporarily before the data is forwarded into the controller 2200. Cache memory 2003 may also store the read data that are requested by the host computer 1000. Cache memory 2003 may also be realized by a non-volatile memory backed-up by a battery. In another implementation, memory 2002 and cache memory 2003 are commonly combined as a single memory.

A host interface (NIC) 2004 is used to connect between host 1000 and NAS Head 2100. Ethernet is a typical example of the connection, but other suitable connection types may also be used. Storage connection interface 2005 is used to connect between NAS head 2100 and storage controller 2200. Fiber Channel (FC) and Ethernet are typical examples of the connection, but other connections types may be used. In the case of an internal connection between NAS head 2100 and controller 2200, a system bus is a typical example of the connection. Management interface (NIC) 2007 is used to connect between a storage management computer service processor (SVP) 2006 and NAS Head 2100. Service Processor (SVP) 2006 is connected with the storage system 2000, and is used to set/change the configuration of the storage system 2000. Ethernet is again a typical example of such connection.

The controller 2200 includes a CPU 2011, a memory 2012, a cache memory 2013, a host interface (HBA) 2014, a storage connection interface (HBA) 2015, a disk interface (DKA) 2016, and a management interface (NIC) 2017. Controller 2200 processes I/O requests from the NAS Head 2100. A program to process I/O requests or other operations is stored in the memory 2012, and CPU 2011 executes the program. Cache memory 2013 stores the write data from the NAS Head 2100 temporally before the data is stored into storage devices 2300. Cache memory 2013 may also store the read data that are requested by the NAS Head 2100. Cache 2013 may be a battery backed-up non-volatile memory. In another implementation, memory 2012 and cache memory 2013 are commonly combined as a single memory.

Host interface (HBA) 2014 is provided between NAS Head 2100 and controller 2200. Storage connection interface (HBA) 2015 is provided between storage controllers 2200 and 3200. Controller 3200 includes a connection interface (HBA) 3015 for connecting controller 3200 to HBA 2015 at controller 2200. Fiber Channel (FC) and Ethernet are typical examples of the network 2800 for these connections. Disk interface (DKA) 2016 is used to connect storage devices 2300 and the disk controller 2200. Management interface (NIC) 2017 is used to connect storage management computer SVP 2006 and storage controller 2200. Ethernet is a typical example of such connection. Each of storage devices 2300 process I/O requests in accordance with SCSI Device protocol commands. Other appropriate hardware architecture can also be used with the present invention.

FIG. 2 shows an example of application of a software configuration for the method and apparatus of the present invention. The system includes Application Host 1000, Management Host 1100, NAS Head 2100 and Storage Controller 2200, as described above.

Application Host 1000 includes Application Software (AP) 1011 which generates I/O operations. The I/O operations are sent to the NAS Head by a network file sharing protocol such as NFS/CFIS 1012. Storage Management Software (Storage Manager) 1021 resides on Management Host 1100. The storage administrator issues storage management operations such as snapshot operations and remote copy operations using the Storage Manager 1021

As mentioned above, NAS Head 2100 is a part of storage system 2000. File related operations are processed in this module. Network file sharing protocol server 2021 resides on NAS Head 2100 in order to communicate with its client host 1000. A number of service programs run on NAS Head 2100 such as service daemons 2023 and a NAS Management server 2022. The local file system 2024 processes file I/O operations to the storage system 2000, and drivers 2029 of the storage system translate the file I/O operations to block level operations, and communicate with storage controller 2200 via SCSI commands. A Logical Volume Manager (LVM) 2026 can exist between storage controller 2200 and local file system 2024. LVM 2026 virtualizes physical volumes provided by the storage controller 2200 into logical volumes. Multiple physical volumes can be combined into a logical volume. Moreover, logical volumes can be expanded dynamically. A snapshot module 2025 takes point in time (PIT) copies of files. When it is based on the LVM 2026, the logical volumes are used for snapshot operations. A NAS OS kernel 2027 is included for controlling operations in NAS Head 2100, and a RAID Manager 2028 is used by the storage management software 1021 to control operations served by the storage controller 2200.

Additionally, a Remote Copy Module 2221 provides remote copy operations of storage controller 2200. An I/O operation module (not shown) and other modules can also exist on the storage controller 2200.

Figure 3:
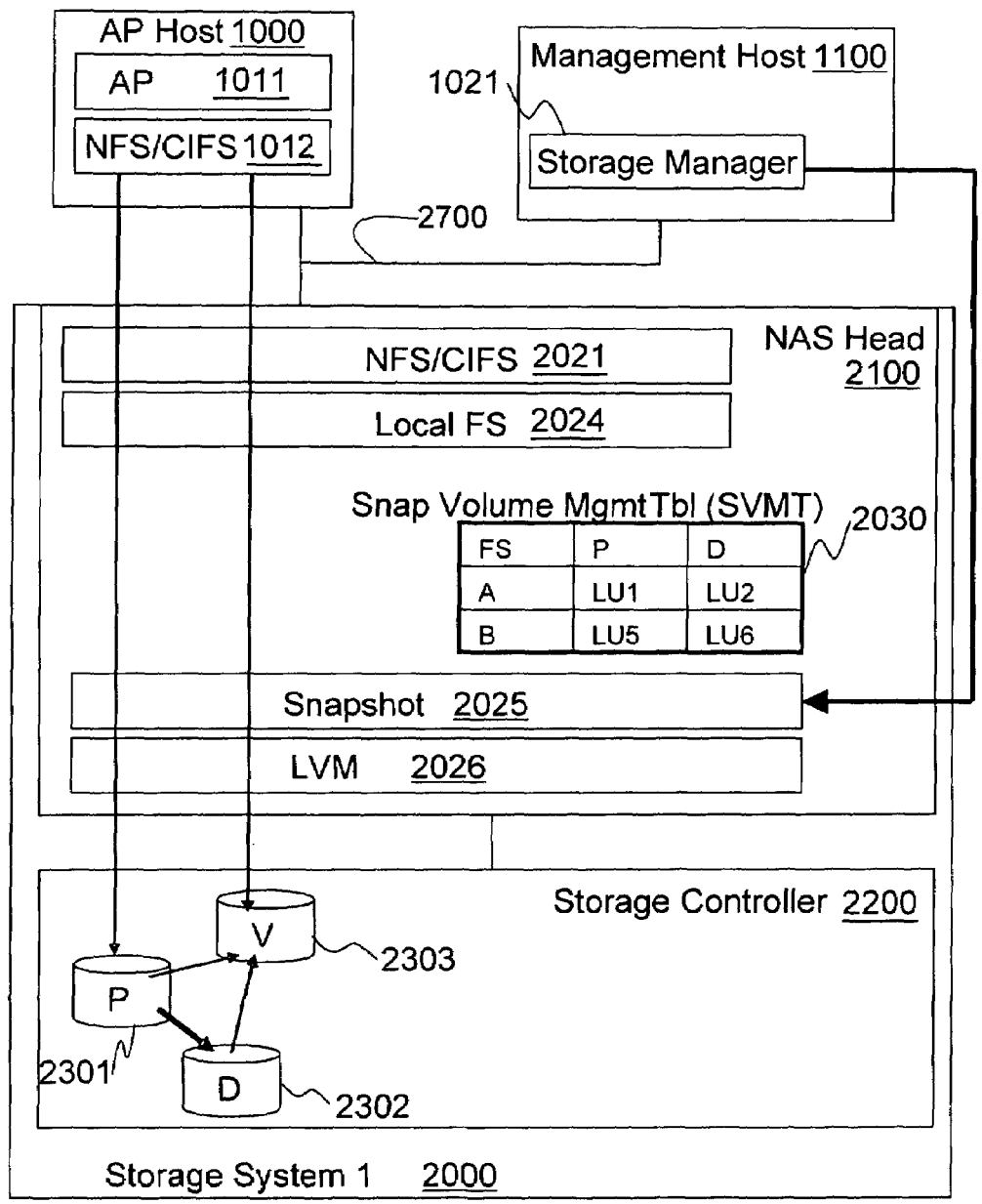
FIG. 3 illustrates an example of snapshot operations used according to the present invention.

FIG. 3 shows an example of snapshot operations used in the following explanation. The snapshot module is based on LVM 2026, which virtualizes physical volumes provided by the storage controller 2200 into logical volumes. The snapshot can be taken for a file system. In the example, a file system is associated with a logical volume. Then, the mapping information between a file system and one or more physical volumes (logical unit) is managed in the Snapshot Volume Management Table (SVMT) 2030 on the snapshot module 2025. Actually, a file system can consist of more than two logical volumes, but only two are shown here for convenience and explanation. Moreover, multiple file systems can exist on a logical volume. In these cases, another mapping table 2030 of the file systems and logical volumes is needed.

It is possible to take a snapshot in the Local FS layer 2024 without using LVM 2026. In this case, the mapping information of file system and logical unit is managed by the Local FS 2024. The following explanations use the first case, which is the case of using LVM 2026.

As illustrated in FIG. 3, snapshot operations are issued by storage administrators on storage management host 1100 or application software 1011 on AP Host 1000. The first operation of snapshot is "start snapshot". After the last point of snapshot, each file or block on a primary volume (P-VOL) 2301 to which new data is written is copied onto a differential volume (D-VOL) 2302. When application software 1011 reads a snapshot image, a snapshot volume (V-VOL) 2303 is created from the P-VOL and D-VOL, and then the local file system Local FS 2024 mounts the V-VOL 2303 and exports it (not shown) to the application software 1011.

The above description is an example of a Copy On Write (COW) snapshot mechanism. P-VOL mirroring can also be used for the snapshot mechanism. In this case, multiple mirrors of P-VOL are prepared. Each time a snapshot command is issued, one of the mirror volumes is split from the P-VOL, and becomes a snapshot image. The mapping information of snapshot image (volume) and point of snapshots (generations) are managed by the RAID Manager 2028 (not depicted in FIG. 3) on NAS Head 2100 which operates the mirror command. In any case, the snapshot related information is managed in some module on NAS head 2100.

Figure 4:
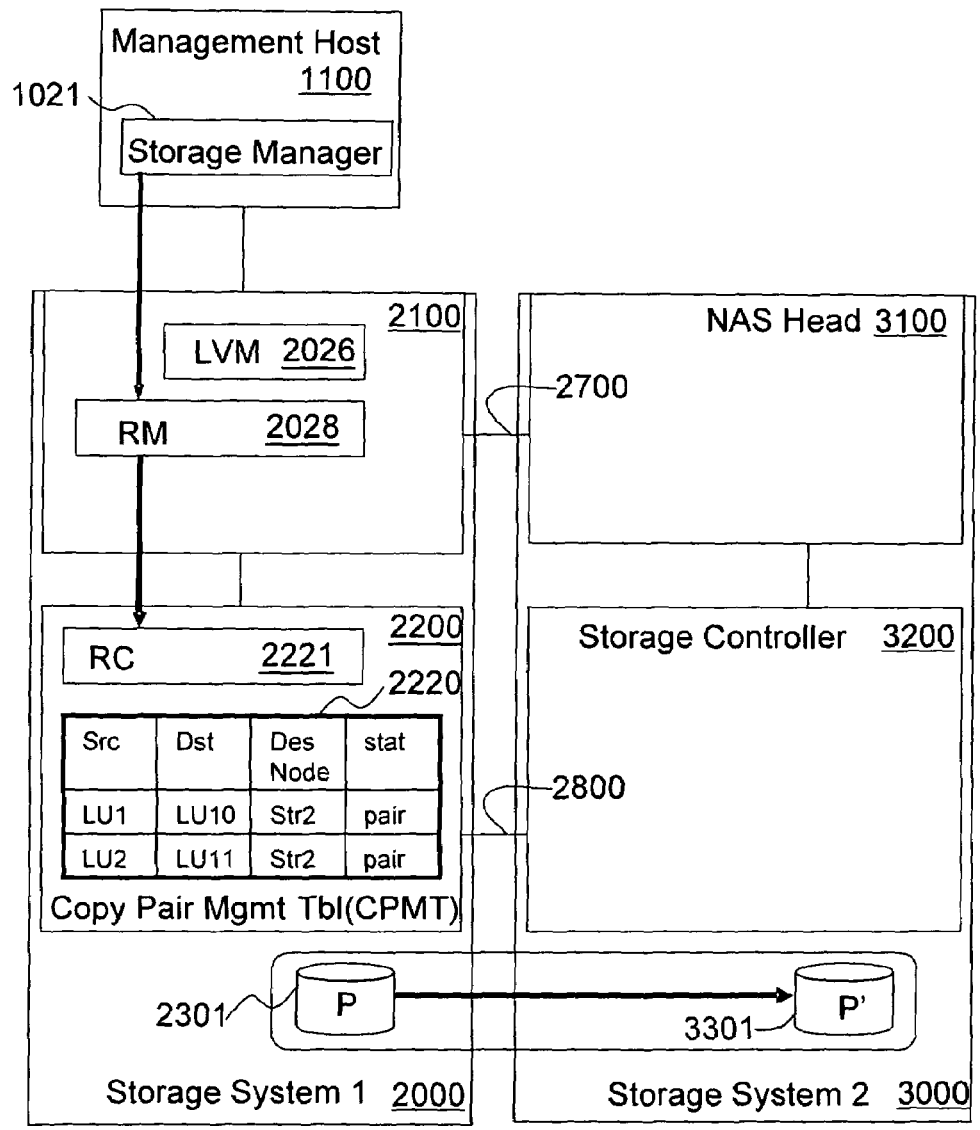
FIG. 4 illustrates an example of remote copy operations used according to the present invention.

FIG. 4 shows an example of remote copy operations. RAID Manager Module 2028 is called by storage manager 1021 on storage management host 1100 to invoke pair creation of a remote copy volume or other operations. Then, RAID Manager 2028 calls a Remote Copy module 2221 on the storage controller 2200. The Remote Copy module 2221 stores the pair information in a Copy Pair Management Table (CPMT) 2220. The CPMT 2220 typically consists of source LU number, destination LU number, destination node name, and pair status. In FIG. 4, a source volume which is LU1 (P 2301) on a storage system 2000 is replicated to a destination volume which is LU10 (P'3301) on a storage system 3000.

The operations to the RAID Manager 2028 can be through LVM 2026. In this case, the operation parameters are designated by logical volumes, instead of logical units, and the LVM 2026 manages the mapping information of logical volumes and logical units.

Other appropriate remote copy mechanisms can be applied to the present invention. For example, an external storage system with local replication can be used. In this case, an external volume is mapped onto the target volume of the local copy of P-VOL. The remote replication operations to the RAID Manager 2028 are replaced by local replication operations, and a local copy module (not depicted in FIG. 4) is called instead of remote copy module 2221 on controller 2200.

Figure 5:
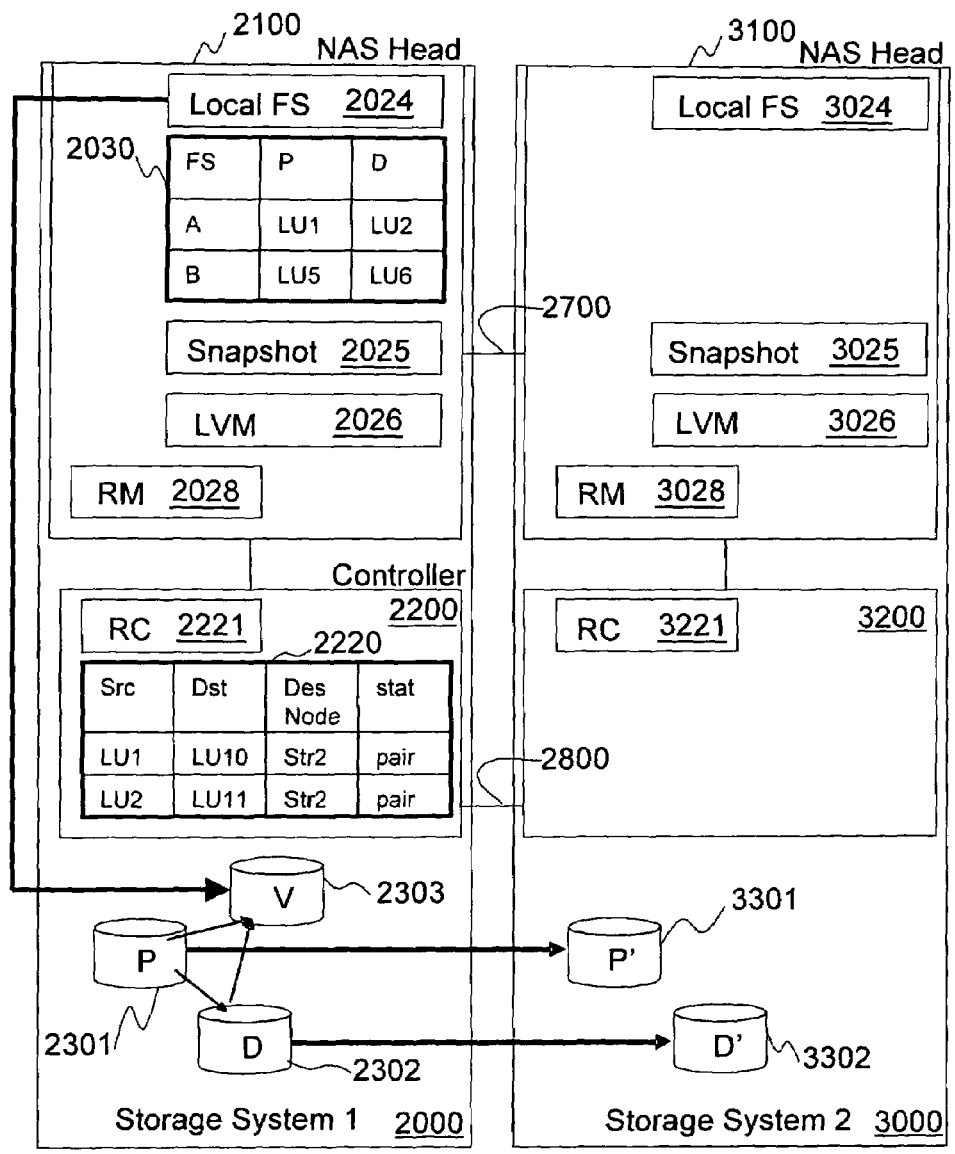
FIG. 5 illustrates a conceptual diagram of a current snapshot remote replication system.

FIG. 5 represents a conceptual diagram of a snapshot remote replication system according to one embodiment of the present invention. Storage system 3000 has modules in a NAS Head 3100 similar to those described above with reference to NAS Head 2100, including a Local FS 3024, a Snapshot module 3025, an LVM 3026, and a RAID manager 3028. Also, storage controller 3200 may include a Remote Copy module 3221. To create a snapshot image (V-VOL) 2303, both P-VOL 2301 and D-VOL 2302 are needed. Both P-VOL 2301 and D-VOL 2303 are replicated to remote storage system 3000 using remote copy, as described above. However, it is impossible for Local FS 3024 on the remote NAS head 3100 to mount a snapshot image because snapshot module 3025 does not have any information regarding the logical units copied as P-VOL (P'-VOL 3301) and D-VOL (D'-VOL 3302).

Figure 6:
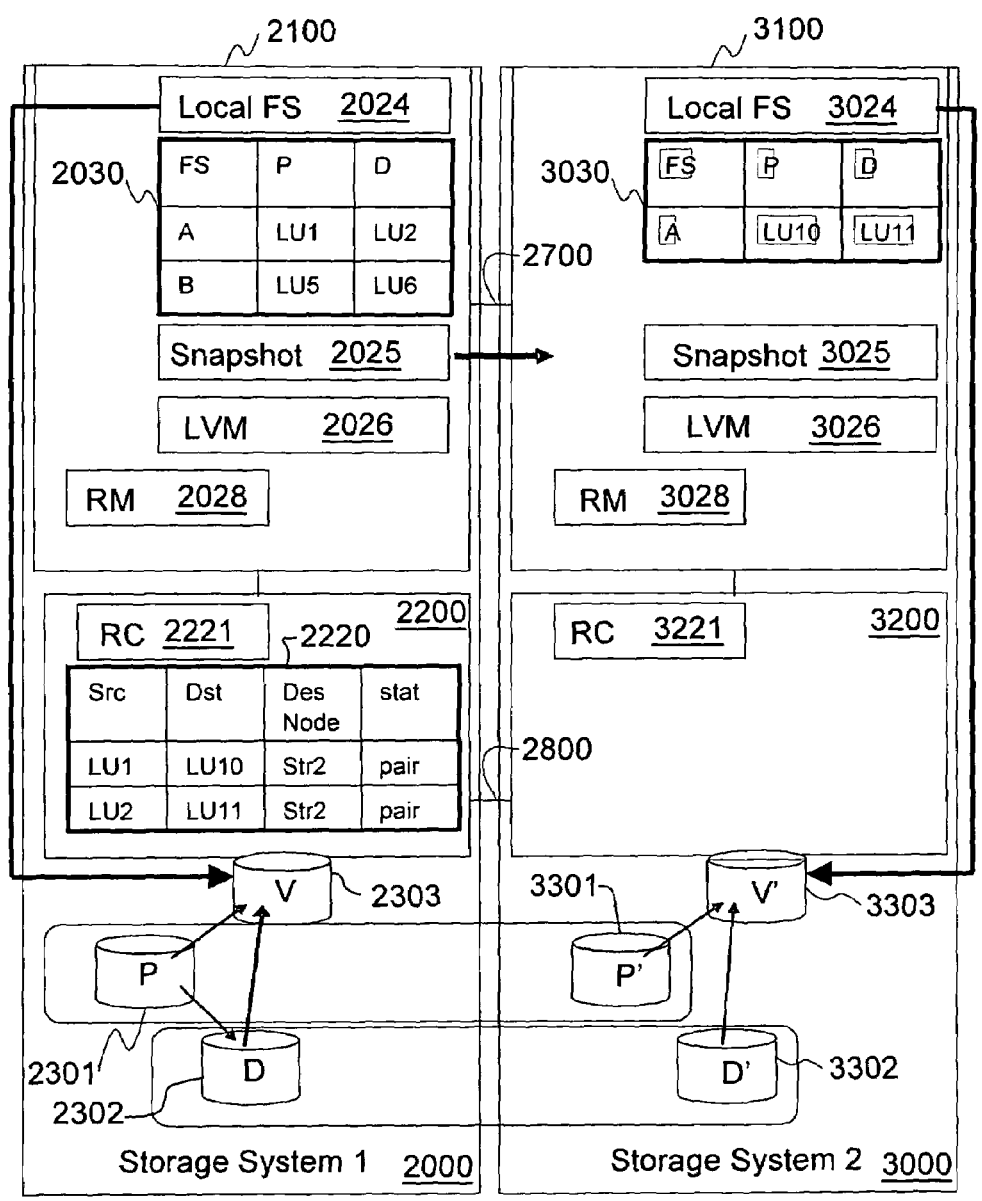
FIG. 6 illustrates a conceptual diagram of a snapshot remote replication system according to the present invention.

FIG. 6 shows a conceptual diagram of snapshot remote replication system according to the present invention. The logical unit mapping information is sent to the remote snapshot module 3025. Then, the local FS 3024 can find the relation of the remote copies of P-VOL (P'-VOL) 3301 and D-VOL (D'-VOL) 3302, and mount a remote snapshot image (V'-VOL) 3303.

Figure 7:
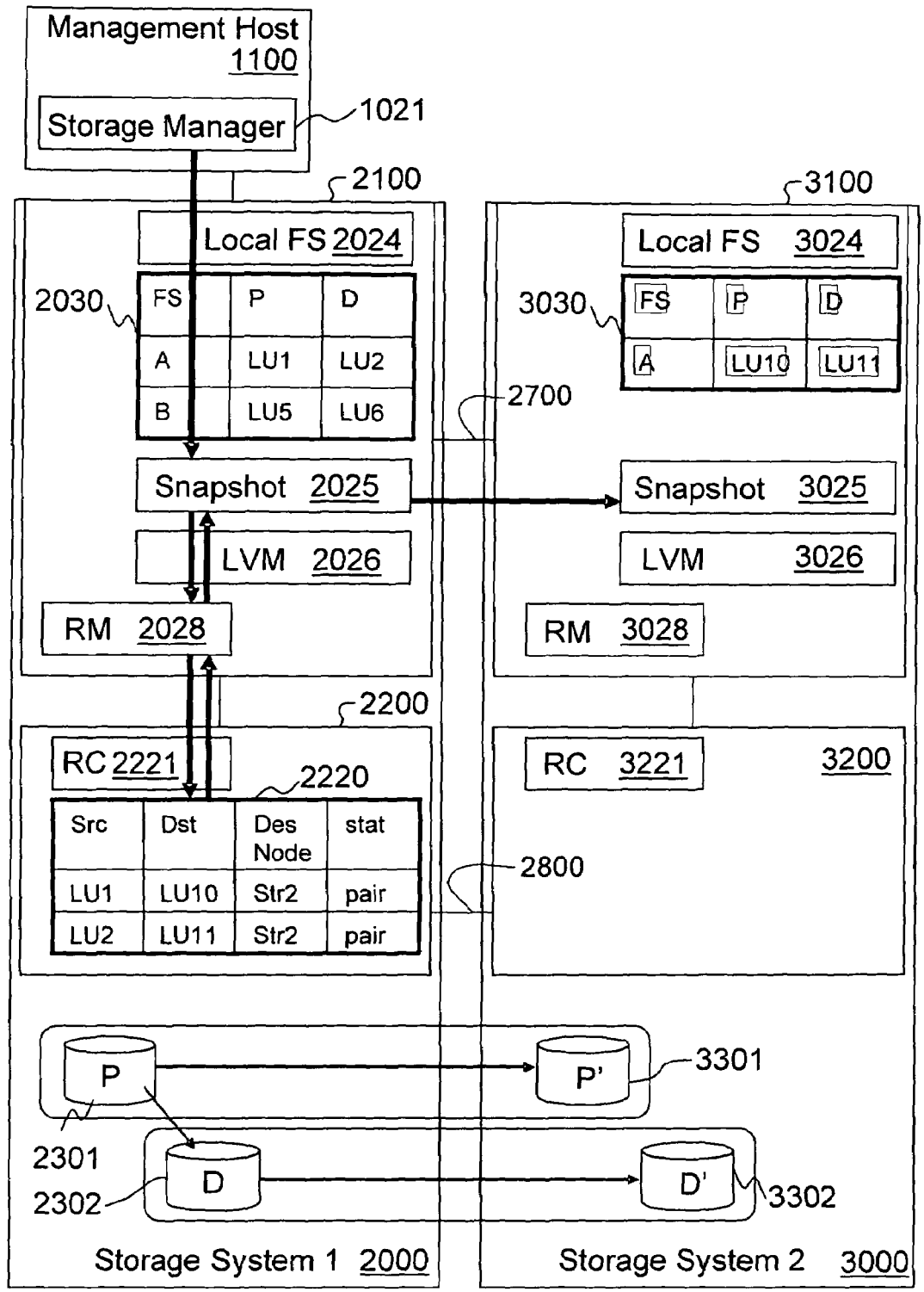
FIG. 7 illustrates processing details of the snapshot remote replication system according to the present invention.
Figure 8:
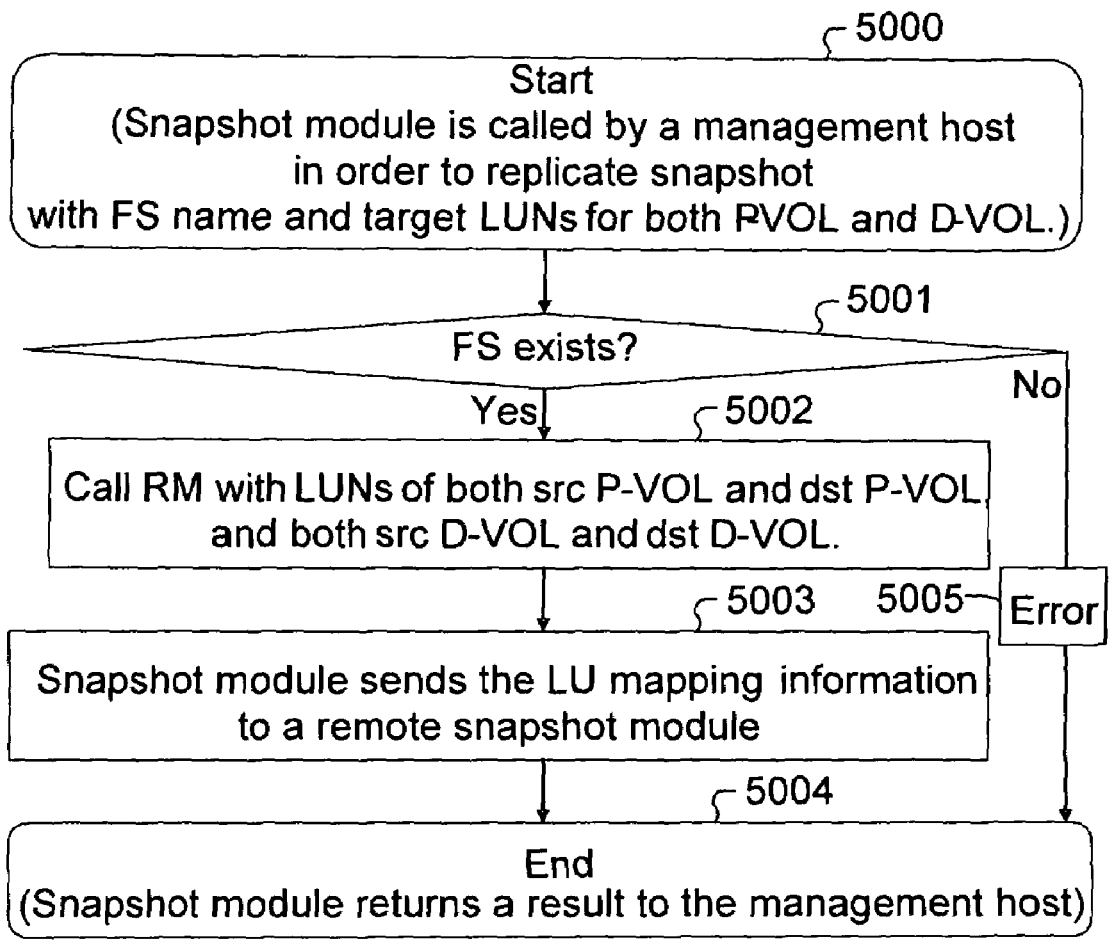
FIG. 8 illustrates a flow of snapshot remote replication of a snapshot module according to an embodiment of the present invention.

FIG. 7 shows detailed processes of the snapshot remote replication system according to the present invention, and FIG. 8 is flowchart of the steps followed by the snapshot module 2025. It is assumed that snapshot operations have already been started and that mapping information of P-VOL and D-VOL are stored in SVMT 2030. In SVMT 2030 in FIG. 7, a logical unit number of P-VOL for file system A is LU1. A logical unit number of D-VOL for file system A is LU2.

At first, a storage management software 1021 on a storage management host 1100 calls a snapshot copy command such as "SnapCopy" of snapshot module 2025 with a file system name (A), destination P-VOL logical unit number (LU10), destination D-VOL logical unit number (LU11), and target host name (Str2) designating Storage System 3000 (Step 5000). The command could be as follows: SnapCopy (FS name, dest P-VOL LUN, dest D-VOL LUN, target host). Next, the snapshot module 2025 checks if the designated file system name is in SVMT 2030 (Step 5001). If the file system does not exist, the snapshot module 2025 sends back an error (Step 5005). If the file system exists, the snapshot module 2025 finds its P-VOL logical unit number (LU1) and D-VOL logical unit number (LU2) in SVMT 2030. Snapshot module 2025 then calls RAID Manager 2028 with a target host name (Str2), the logical unit number of both source P-VOL (LU1) and destination P'-VOL (LU10), and also the logical unit number of both source D-VOL (LU2) and destination D'-VOL (LU11) (Step 5002). The RAID manager module 2028 calls Remote Copy module 2221 on storage controller 2200 with the same parameters as it receives from the snapshot module 2025. The Remote Copy module 2221 stores the received information into a Copy Pair Management Table (CPMT) 2220 and the replication of P-VOL and D-VOL is started. When the snapshot module 2025 receives an indication of the successful start of replication, it generates and sends mapping information of remote P'-VOL (LU10) and remote D'-VOL (LU11) for the replicated file system snapshot to the destination node's snapshot module 3025 via network 2700 between NAS head 2100 and NAS head 3100 (Step 5003). Finally, the snapshot module 2025 sends back a result of the snapshot replication operation to the storage management software 1021 (Step 5004).

Figure 9:
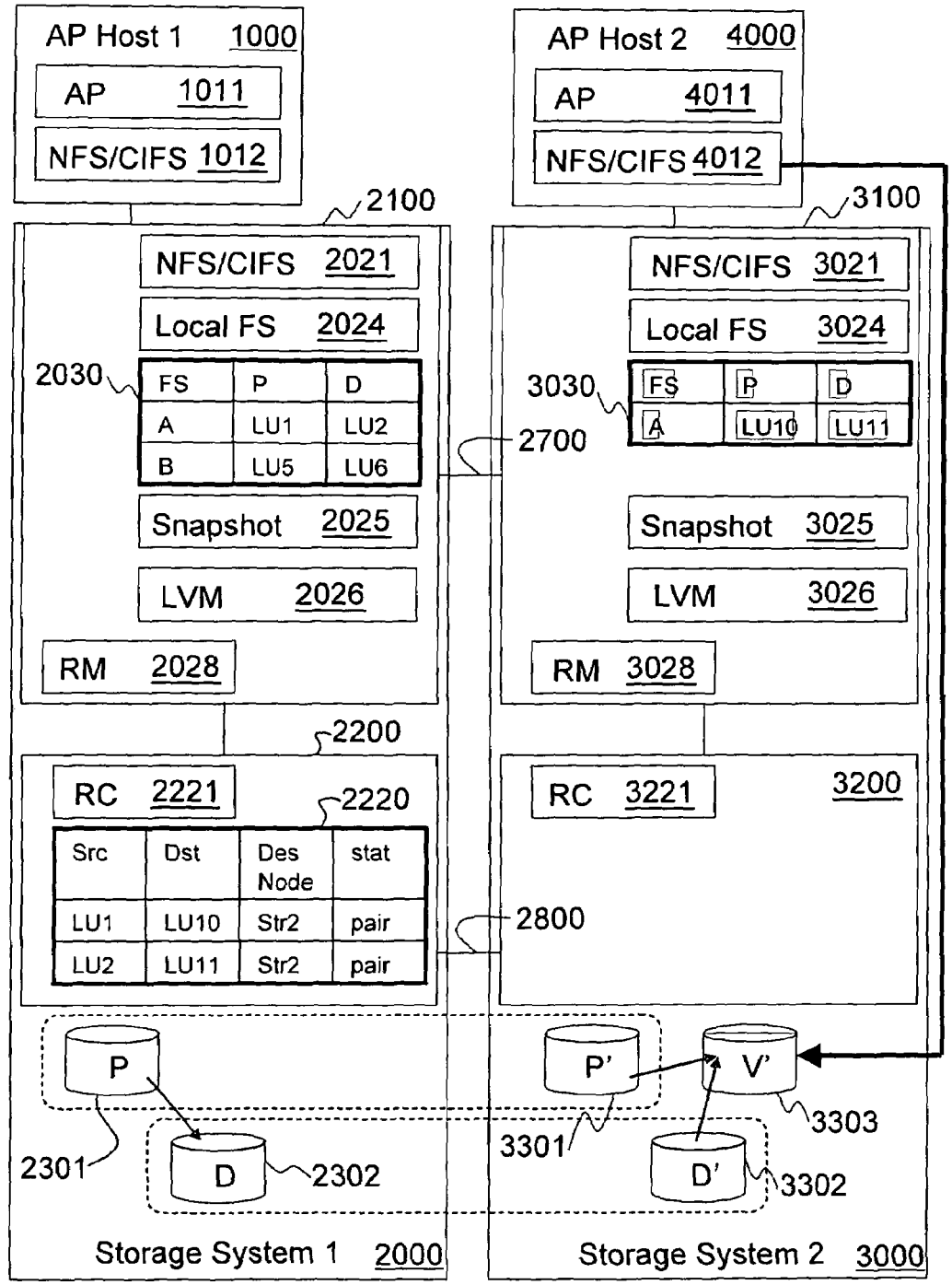
FIG. 9 illustrates a conceptual diagram of a mount operation of the replicated snapshot image.

FIG. 9 shows a conceptual diagram of the mount operation of the replicated snapshot image according to the present invention. A storage management software (not depicted in FIG. 9) calls snapshot module 3025 to create a snapshot image (V'-VOL) of a file system A. A snapshot image logical volume (V'-VOL) 3303 can be generated from the data of both replicated primary volume (P'-VOL) 3301 and replicated differential volume (D'-VOL) 3302 by the snapshot module 3025. The logical unit information for both P'-VOL 3301 and D'VOL 3302 is stored in SVMT 3030. Thus, the snapshot module 3025 can find both P'-VOL and D'-VOL correctly. When the remote snapshot image (V'-VOL) is created, the remote replication pair can be split. A local FS 3024 on a NAS head 3100 can mount the remote snapshot volume (V'-VOL) 3303. It can then export the virtual volume, which is a snapshot image of file system A. Then, application software 4011 on a second application host 4000 can mount the snapshot volume (V'-VOL) 3303 and accesses the file system A through a network file sharing protocol.

2nd Embodiment

Figure 10:
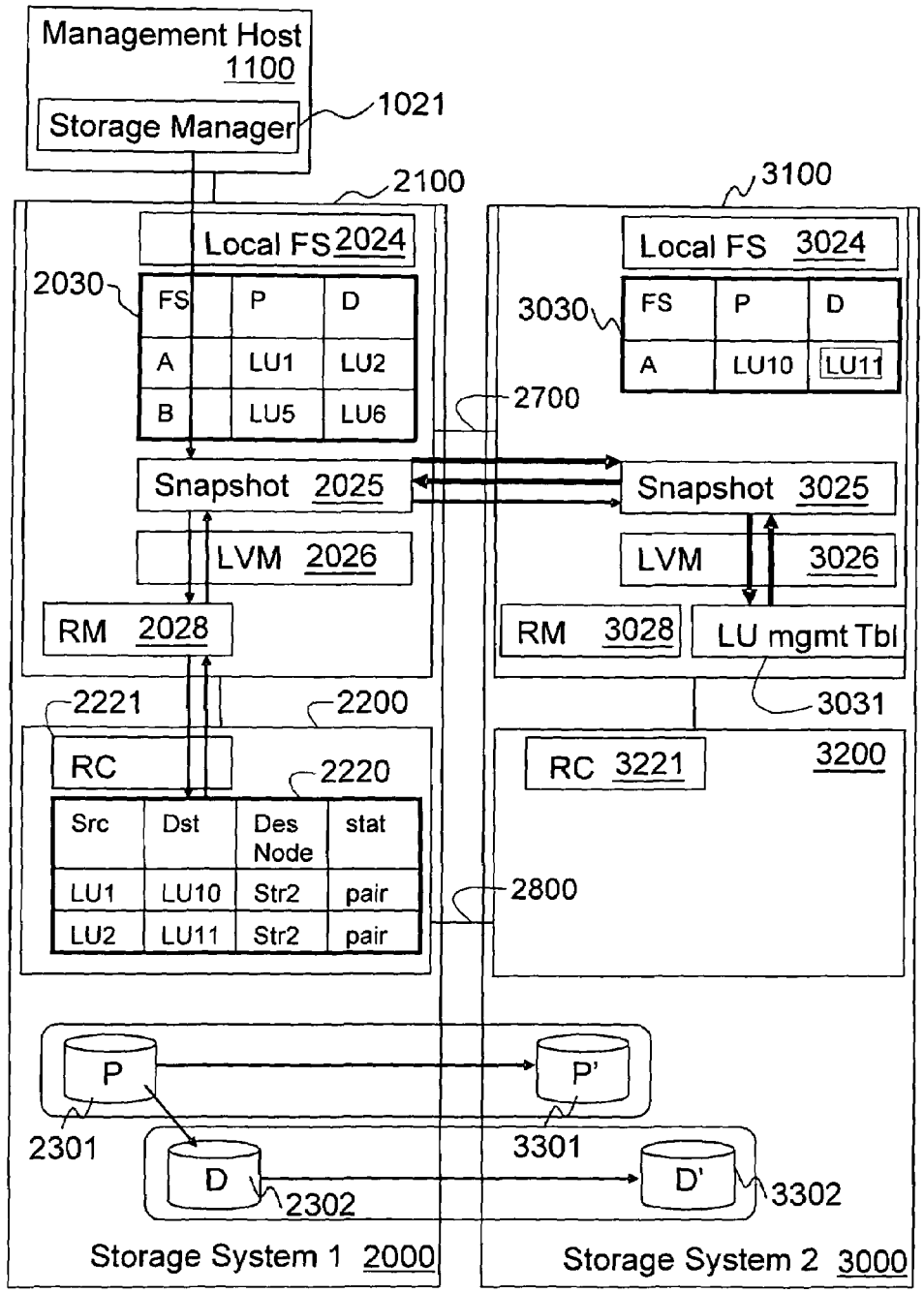
FIG. 10 illustrates detailed processes of the inventive snapshot remote replication system.
Figure 11:
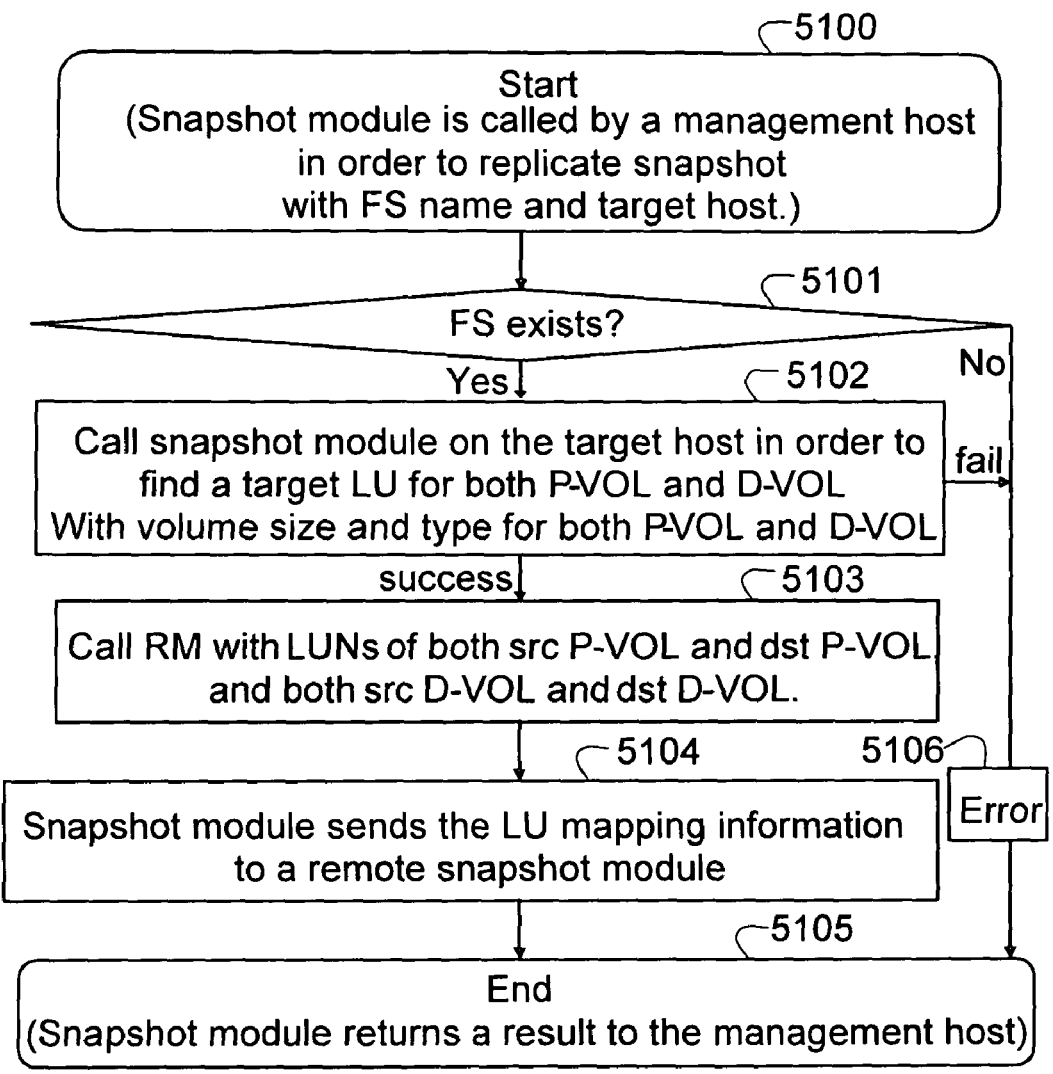
FIG. 11 illustrates a flow of the inventive snapshot remote replication of the snapshot module.
Figures 12, 13:
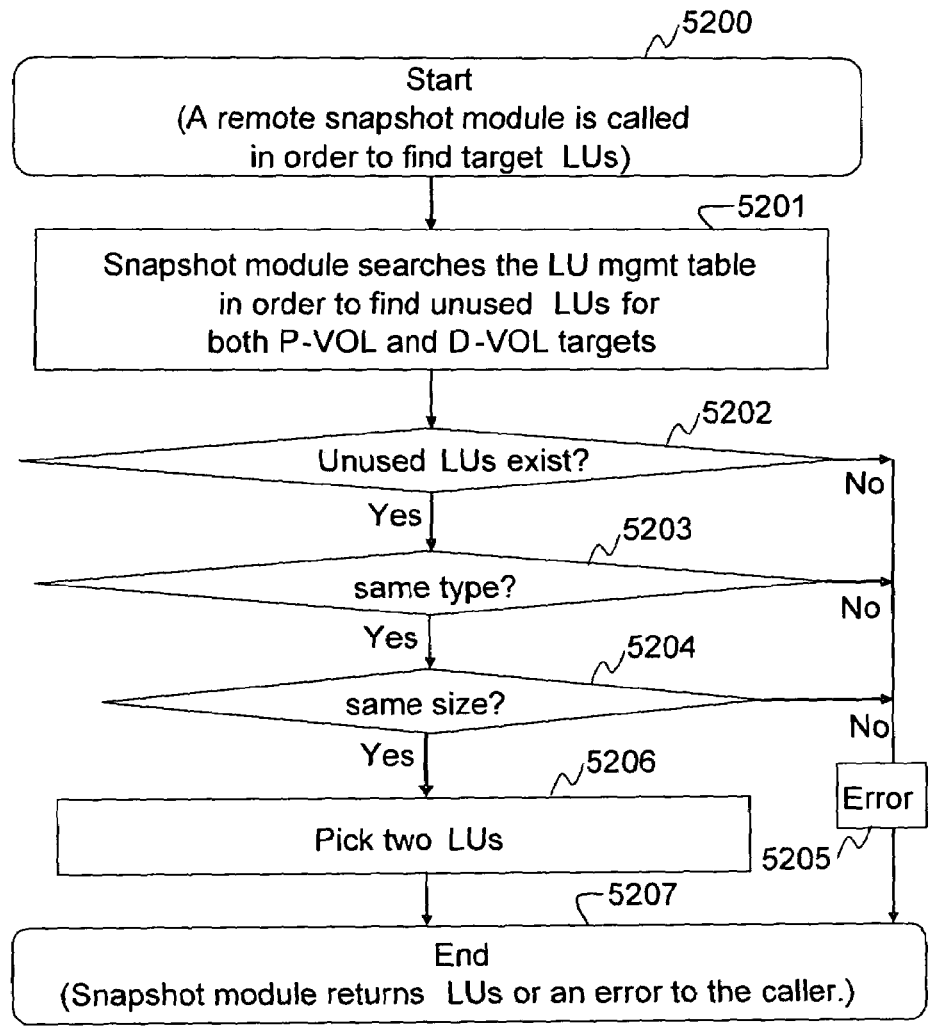
FIG. 12 illustrates a flowchart for finding unused logical units in a remote snapshot module.
FIG. 13 illustrates a typical construction of a logical unit management table (LUMT).

FIG. 10 shows detailed processes of a second embodiment of the snapshot remote replication system according to the present invention. FIG. 11 is a flow chart illustrating steps performed by snapshot module 2025. Assuming that snapshot operations have already been started, mapping information of P-VOL 2301 and D-VOL 2302 are stored in SVMT 2030. In FIG. 10, a logical unit number of P-VOL 2301 for file system A is LU1. A logical number of D-VOL 2302 for file system A is LU2. First, storage manager 1021 on storage management host 1100 calls a snapshot copy command like "SnapCopy" of snapshot module 2025 with a file system name (A) and target host name (Str2) designating storage system 3000 as the target host (Step 5100). However, in this embodiment, logical unit numbers of both destination P-VOL (P'-VOL) 3301 and destination D-VOL (D'-VOL) 3302 are not designated by the storage management software 1021 (e.g., SnapCopy (FS name, target host)). The snapshot module 2025 checks if the designated file system name (A) is in the SVMT 2030 (Step 5101). If the file system does not exist, the snapshot module 2025 sends back an error (Step 5106). If the file system exists, the snapshot module 2025 calls remote snapshot module 3025 in order to find unused logical units for target of replication of P-VOL 2301 and D-VOL 2302 using information of volume size and type for both P-VOL 2301 and D-VOL 2302 (Step 5102). A flow of the steps followed by remote snapshot module 3025 is illustrated in FIG. 12, and explained later. If there are not two or more unused appropriate logical units in the remote storage system 3000, the snapshot module 2025 sends back an error (Step 5106). After receiving designations for unused logical units (LU10 and LU11) from the remote snapshot module 3025, the snapshot module 2025 finds its P-VOL logical unit number (LU1) and D-VOL logical unit number (LU2) in the SVMT 2030 for the designated file system A. Then, snapshot module 2025 calls RAID Manager 2028 with a target host name (Str2), the logical unit number of both source P-VOL (LU1) 2301 and destination P'-VOL (LU10) 3301, and also the logical unit number of both source D-VOL (LU2) 2302 and destination D'-VOL (LU11) 3302 (Step 5103). The RAID manager module 2028 calls Remote Copy module 2221 on a storage controller 2200 with the same parameters that were received from the snapshot module 2025. The Remote Copy module 2221 stores the received information into a Copy Pair Management Table (CPMT) 2220 and the replication of P-VOL 2301 and D-VOL 2302 is started. When the snapshot module 2025 receives an indication that successful replication has started, it generates and sends mapping information of remote P'-VOL (LU10) 3301 and remote D'-VOL (LU11) 3302 for the replicated file system snapshot to the destination node's snapshot module 3025 via network 2700 between NAS head 2100 and NAS head 3100 (Step 5104). Finally, the snapshot module 2025 sends back a result of the snapshot replication operation to the storage manager 1021 (Step 5105).

FIG. 12 is a flowchart illustrating the steps of finding unused logical units in the remote snapshot module 3025. When the remote snapshot module 3025 receives an unused logical unit search request (Step 5200), it searches the Logical Unit Management Table (LUMT) 3031 managed by LVM 3026 to determine whether there are unused logical units (Step 5201).

FIG. 13 shows a typical construction of LUMT 3031. LUMT 3031 includes information such as Logical Unit Number (LUN), unit type, size, and whether or not the unit is being used. Snapshot module 3025 checks whether there are at least two unused volumes available (Step 5202). If snapshot module 3025 finds fewer than two unused volumes, it sends back an error (Step 5205). However, if snapshot module 3025 can find two or more unused logical units, it checks whether the type of the unused logical units is same as the source logical unit, the information of which is passed from the source snapshot module 2025 (Step 5203). If snapshot module 3025 cannot find two or more logical units of same type, it sends back an error (Step 5205). If snapshot module 3025 finds two or more logical units of same type, it checks whether they are of the correct size (Step 5204). If snapshot module 3025 cannot find two or more logical units of the correct size, it sends back an error (Step 5205). If snapshot module 3025 finds two or more logical units of correct size, it picks two of the logical units (Step 5206). There are various ways of picking two logical units, any of which can be employed. For example, the first two appropriate logical units could be picked from their entry in the LUMT 3031. Other replication target volume properties can be checked here in addition to type and size. Such additional specification information would also be passed from the source snapshot module 2025. Finally, the snapshot module 3025 returns designations for two unused logical units for replicated P-VOL (P'-VOL) 3301 and D-VOL (D'-VOL) 3302, or an error to the source snapshot module 2025 (Step 5207). The mount operations of the replicated snapshot are the same as described above in the previous embodiment.

In the second embodiment above, the destination primary volume P'-VOL 3301 and destination differential volume D'-VOL 3302 are located and their information is returned to snapshot module 2025. However, it is possible to transfer information regarding P-VOL 2301 and D-VOL 2302 to snapshot module 3025 and allow snapshot module 3025 to find suitable unused destination volumes and call RAID manager module 2028 which in turn calls a Remote Copy module 2221 to start replication as mentioned above.

3rd Embodiment

Figure 14:
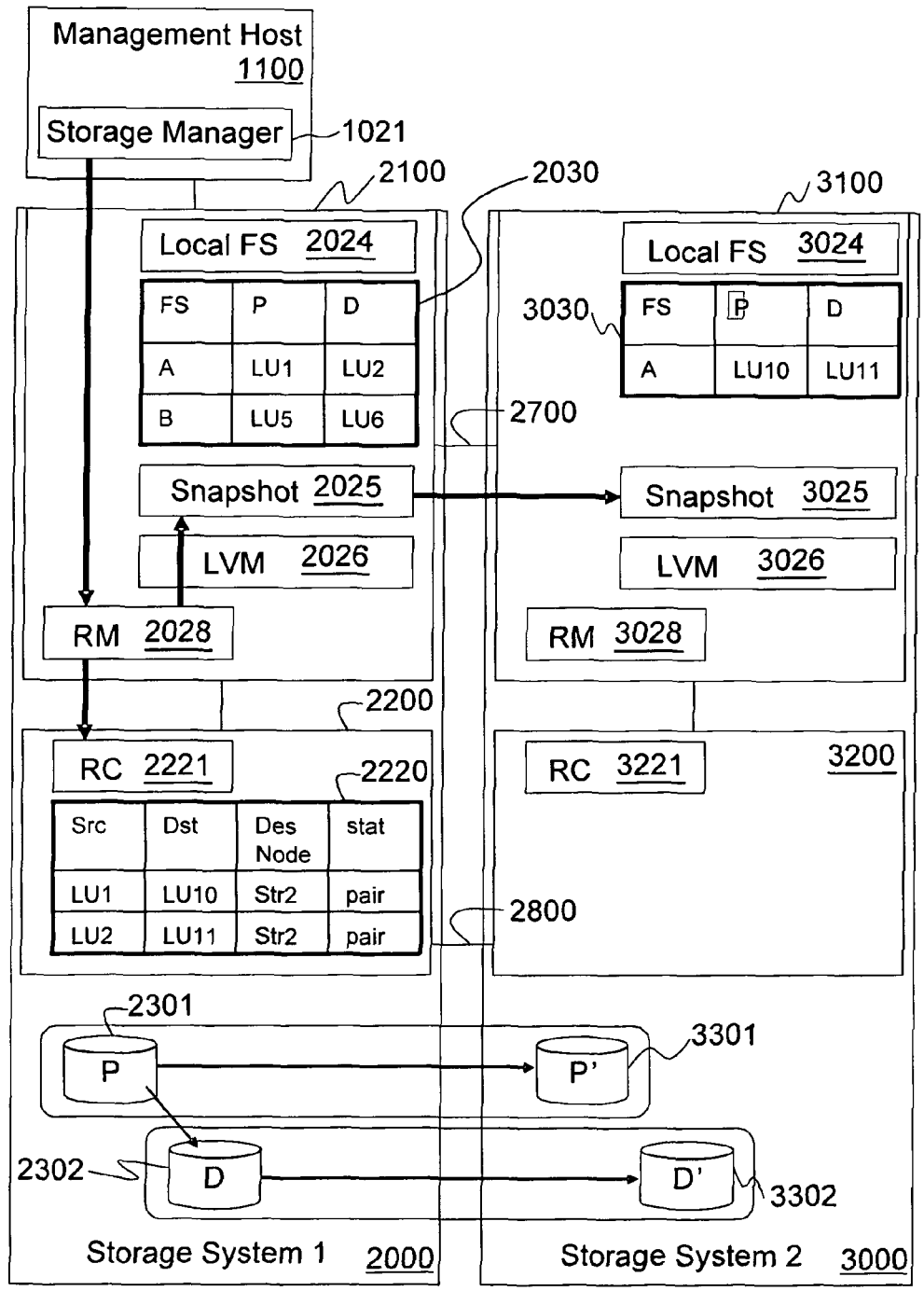
FIG. 14 illustrates detailed processes of the inventive snapshot remote replication system.
Figure 15:
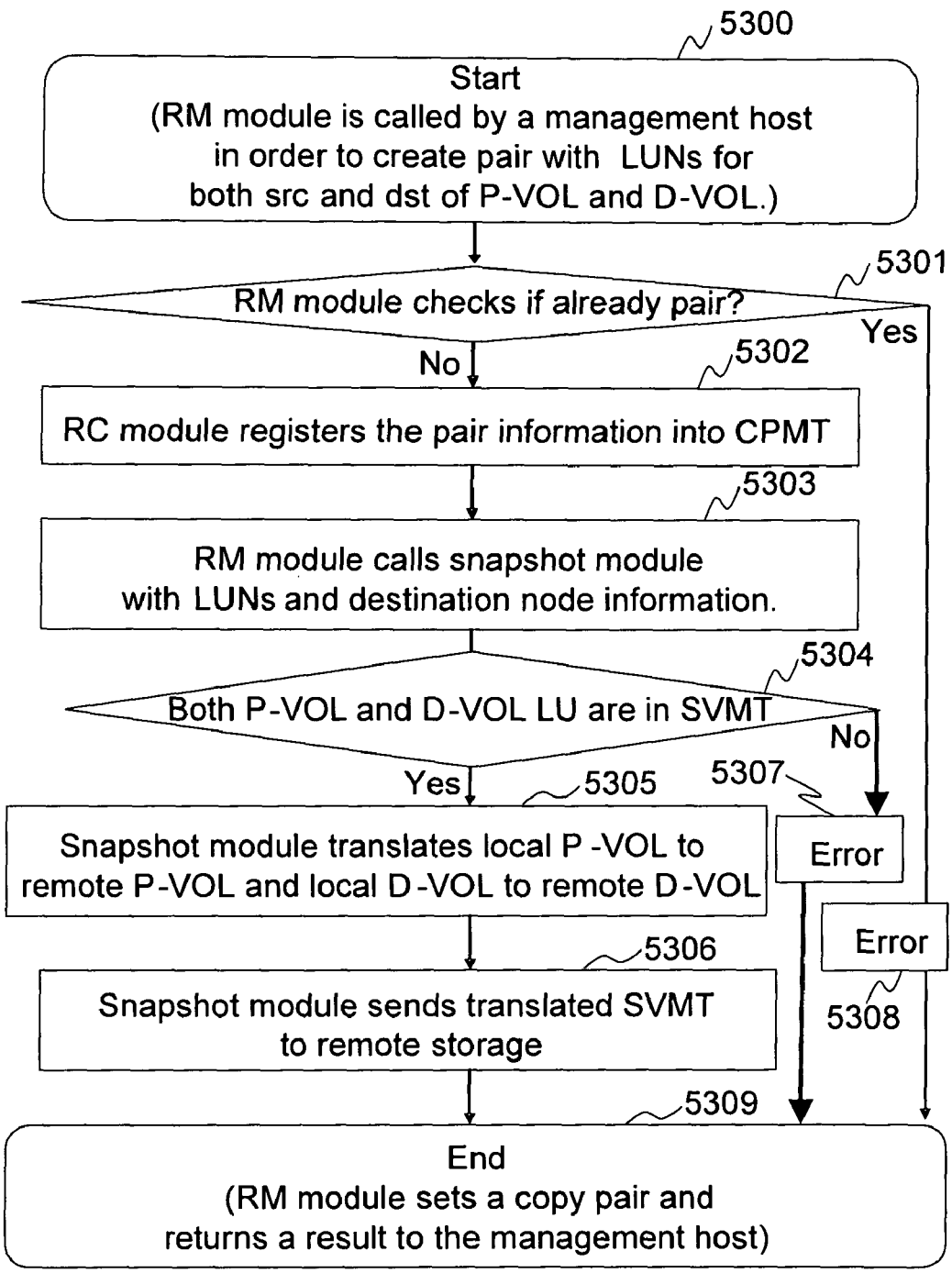
FIG. 15 illustrates a flow of the inventive snapshot remote replication.

The above embodiments extend snapshot operations. In other words, the snapshot module receives a request of snapshot remote replication from the storage management software. According to the third embodiment, the snapshot operation is not extended, but in instead so called "PairCreate" operations to a RAID Manager are extended. This means that the RAID Manager module 2028 receives a request of snapshot remote replication from the storage manager. FIGS. 14 and 15 are directed to this third embodiment of the present invention.

Assuming that snapshot operations have already been started, the mapping information of P-VOL 2301 and D-VOL 2302 are stored in SVMT 2030. In FIG. 14, a logical unit number of P-VOL 2301 for file system A is LU1. A logical number of D-VOL 2302 for file system A is LU2. Storage Manager 1021 on storage management host 1100 calls a remote replication pair creation command in RAID Manager module 2028 with both source primary volume (P-VOL 2301) and destination primary volume (P'-VOL 3301) logical unit numbers (LU1, LU10), both source differential volume (D-VOL 2302) and destination differential volume (D'-VOL 3302) logical unit numbers (LU2, LU11), and target host name (Str2) (Step 5300). An example of the command is as follows: SnapPairCreate (src P-VOL LUN, dest P-VOL LUN, src D-VOL LUN, dest D-VOL LUN, target host). The RAID Manager module 2028 asks if the designated P-VOL LU and D-VOL LU have already made a pair to Remote Copy module 2221 in a storage controller 2200, and passes source and destination primary volume LUNs, source and destination differential volume LUNs, and destination host name (Step 5301). The Remote Copy module 2221 searches the CPMT 2220. If either LUN has already been made into a pair, the RAID Manager module 2028 sends back an error (Step 5308). If both LUNs have not made into a pair yet, the Remote Copy module 2221 makes them a pair and registers the designated pair information in the CPMT 2220, and also sends back an indication of the successful pair create operation (Step 5302). The RAID Manager module 2028 calls the snapshot module 2025 with both source and destination primary volume LUN (LU1, LU10), both source and destination differential volume LUN (LU2, LU11), and target host name (Str2) in order to send a P-VOL and D-VOL relation map to remote snapshot module 3025 (Step 5303). The snapshot module 2025 checks whether the designated source P-VOL logical unit number (LU1) and D-VOL logical unit number (LU2) are in the SVMT 2030 (Step 5304). If either LUN does not exist, the snapshot module 2025 returns an error. After receiving the error, the RAID Manager module 2028 asks the Remote Copy module 2221 to stop the pair operation and changes the pair status (Step 5307). If both LUNs exist, the snapshot module 2025 generates mapping information of remote P'VOL (LU10) and remote D'-VOL (LU11) for the replicated file system snapshot (Step 5305). Then, snapshot module 2025 sends the mapping information to the destination node's snapshot module 3025 via network 2700 between NAS head 2100 and NAS head 3100. (5306) Finally, the RAID Manager module 2028 sends back a result of the snapshot replication operation to the storage management software 1021 (Step 5309). The mount operations of replicated snapshot are the same as the previous embodiment.

4th Embodiment

Figure 16:
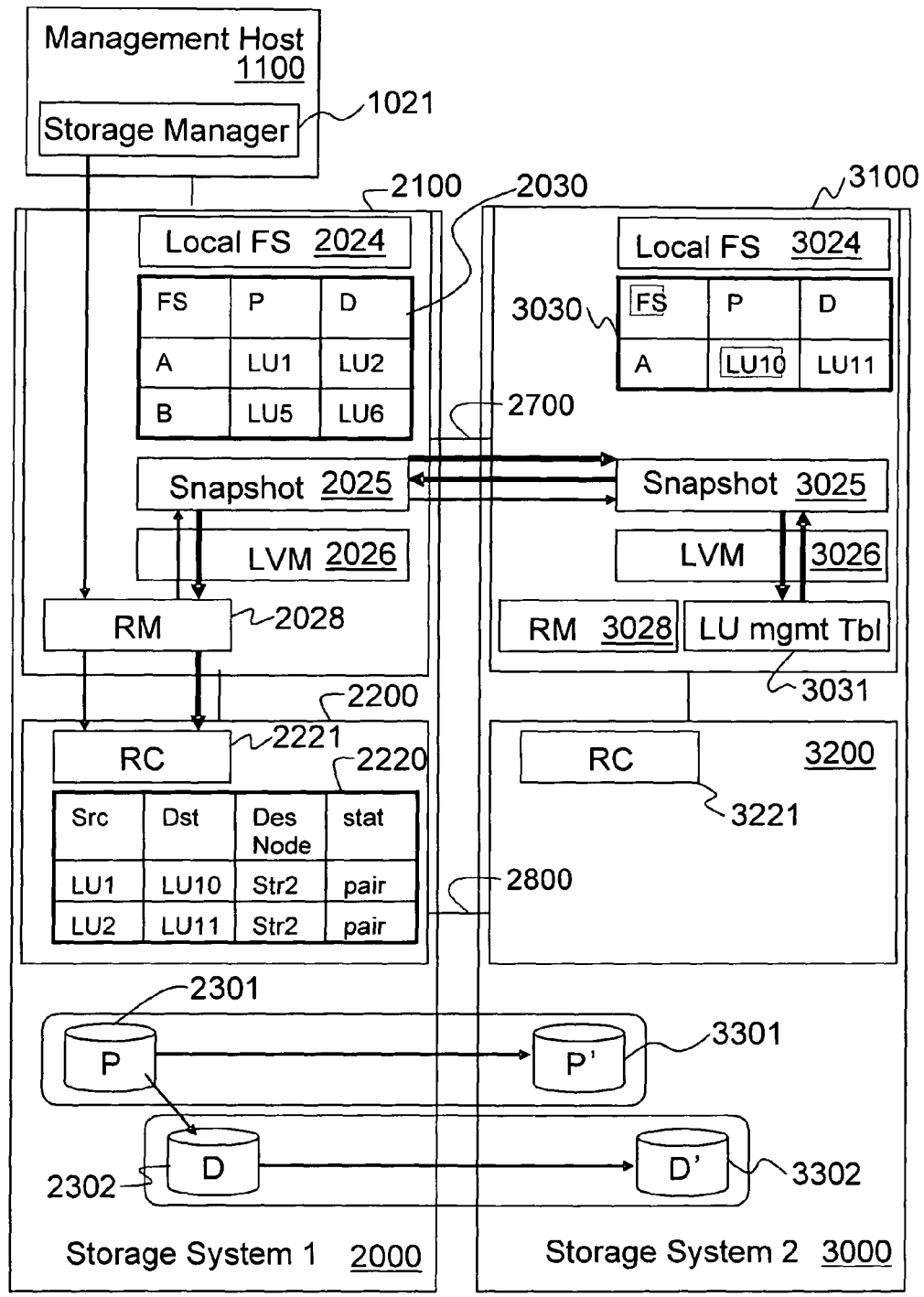
FIG. 16 illustrates detailed processes of the inventive snapshot remote replication system.
Figure 17:
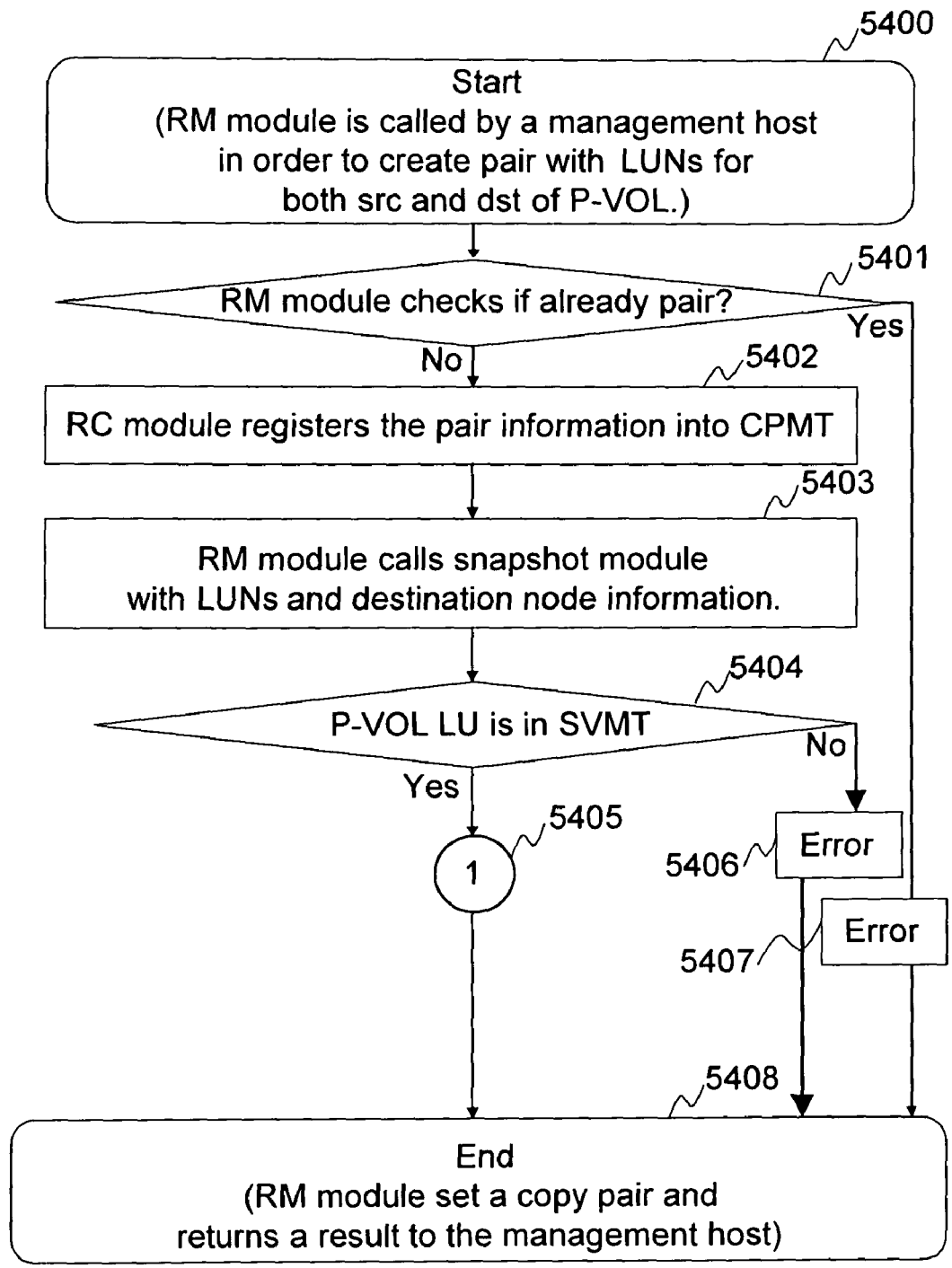
FIG. 17 illustrates a flow of the inventive snapshot remote replication.
Figure 18:
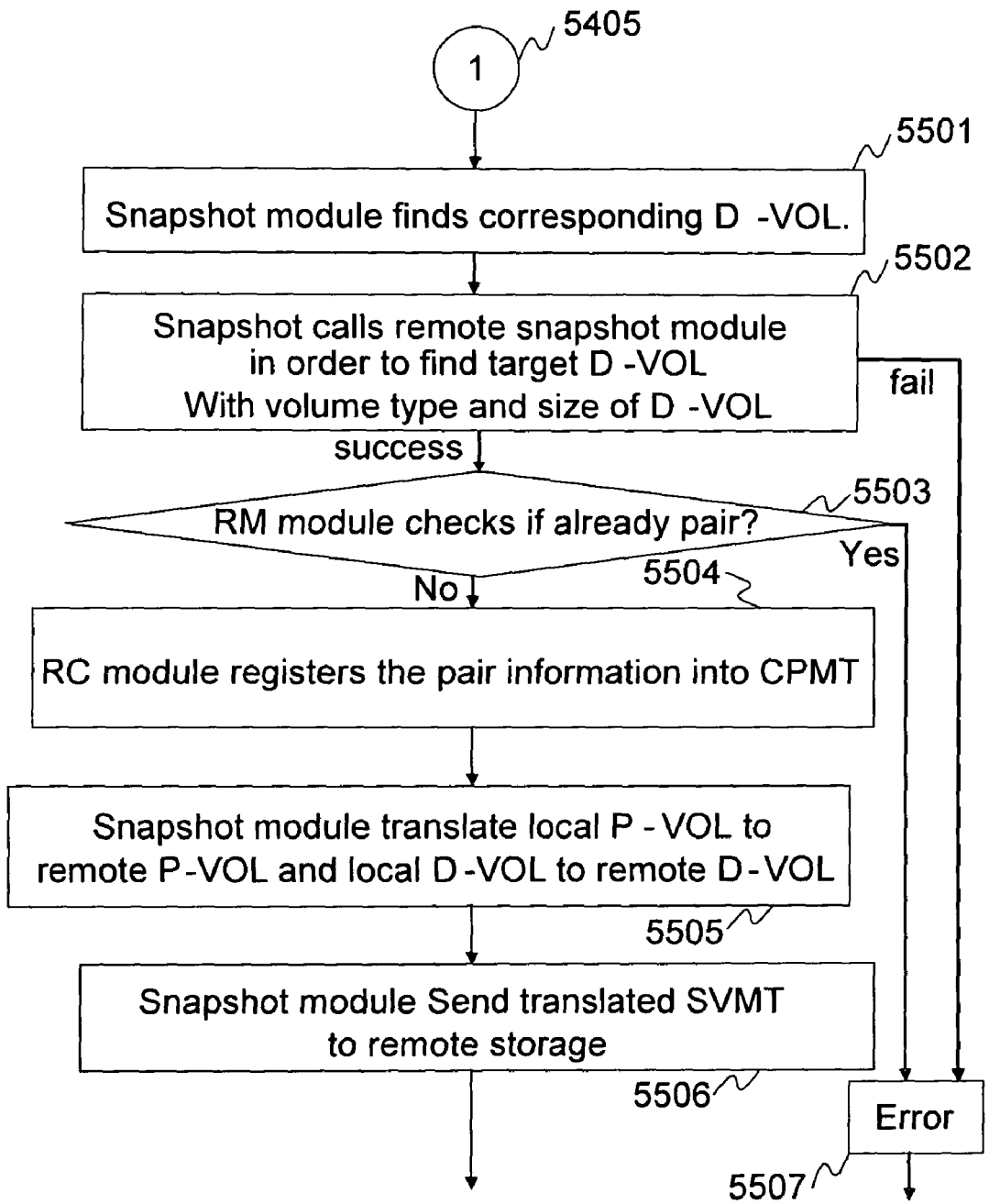
FIG. 18 illustrates a flow of the inventive snapshot remote replication, continued from FIG. 17.

A fourth embodiment of the present invention extends the PairCreate operation on the RAID Manager module. FIGS. 16-18 are directed to this embodiment. Assuming that snapshot operations have already been started, mapping information of P-VOL 2301 and D-VOL 2302 are stored in SVMT 2030. A logical unit number of P-VOL for file system A is LU1. A logical number of D-VOL for file system A is LU2. A storage Manager 1021 on storage management host 1100 calls a remote replication pair creation command in RAID Manager module 2028 with both source and destination primary volume logical unit number (LU1, LU10), and target host name (Str2) (Step 5400). Both source and destination D-VOL can be designated instead of both source and destination P-VOL as an alternative, but under the present scenario the following command can be used: SnapPairCreate (src P-VOL LUN, dest P-VOL LUN, target host). The RAID Manager module 2028 asks if the designated P-VOL LUN has already been made a pair to Remote Copy module 2221 in a storage controller 2200 and transmits source and destination P-VOL LUNs and the destination host name (Step 5401). The Remote Copy module searches the CPMT 2220. If the P-VOL 2301 source LUN and P'-VOL 3301 destination LUN have already been made a pair, the RAID Manager module 2028 sends back an error (Step 5407). If the P-VOL 2301 source LUN and P'-VOL 3301 destination LUN have not been made a pair yet, the Remote Copy module makes a pair, registers the designated pair information in the CPMT 2220 and also sends back an indication of the successful pair create operation (Step 5402). The RAID Manager module 2028 calls the snapshot module 2025 with both source P-VOL and destination P'-VOL logical unit numbers (LU1, LU10), and target host name (Str2) in order to send a P-VOL and D-VOL relation map to a remote snapshot module 3025 (Step 5403). The snapshot module 2025 checks if the designated P-VOL LUN (LU1) is in the SVMT 2030 (Step 5404). If the LUN does not exist, the snapshot module 2025 returns an error. After receiving the error, the RAID Manager module 2028 asks the Remote Copy module 2221 to stop the pair operation and changes the pair status (Step 5406). If the LUN does exist, the snapshot module 2025 searches the SVMT 2030 to find the source D-VOL (LU2) that is associated with source P-VOL (Step 5501). Then, the snapshot module 2025 calls remote snapshot module 3025 in order to find unused logical units for target of replication of D-VOL 2302 (Step 5502). Steps performed by the remote snapshot module 3025 will be explained later. If there are no unused appropriate logical units in the remote storage system 3000, the snapshot module 2025 sends back an error (Step 5507). After receiving the unused logical unit (LU11) from the remote snapshot module 3025, the snapshot module 2025 calls RAID Manager 2028 with a target host name (Str2), and the logical unit number of both source D-VOL 2302 (LU2) and destination D'-VOL 3302 (LU11). The RAID Manager module 2028 asks if the designated D-VOL, D'-VOL LUNs have already been made a pair to Remote Copy module 2221 in a storage controller 2200 and passes source D-VOL and destination D'-VOL LUNs, and destination host name (Step 5503). If the source D-VOL LUN and destination D'-VOL LUN have already been made into a pair, the RAID Manager module 2028 sends back an error (Step 5507). If the LUNs have not been made into a pair yet, the Remote Copy module 2221 makes a pair, registers the designated pair information in the CPMT 2220, and sends back an indication of the successful pair create operation (Step 5504). The snapshot module 2025 generates mapping information of remote destination P'-VOL 3301 (LU10) and remote destination D'-VOL 3302 (LU11) for the replicated file system snapshot (Step 5505). Then, snapshot module 2025 sends this to the destination node's snapshot module 3025 via network 2700 between NAS head 2100 and NAS head 3100 (Step 5506). Finally, RAID Manager module 2028 sends back a result of the snapshot replication operation to the storage manager 1021 (Step 5408).

The method of finding two or more unused logical units was described above with respect to FIG. 12. In the present embodiment, one or more logical units are searched for in the Logical Unit Management Table (LUMT) 3031. When the remote snapshot module 3025 receives an unused logical unit search request, snapshot module 3025 searches LUMT 3031, which is managed by LVM 3026. Snapshot module 3025 checks whether there is at least one unused volume. If snapshot module 3025 finds no unused logical unit, it sends back an error. If the snapshot module 3025 can find one or more unused logical units, it checks if the type of the unused logical units is the same as the source logical unit, which is information passed from the source snapshot module 2025. If snapshot module 3025 can find no logical units of same type, it sends back an error. If the snapshot module 3025 finds one or more logical units of same type, it checks whether the size of the logical units is sufficient. If snapshot module 3025 cannot find any logical units of the correct size, it sends back an error. If snapshot module 3025 finds one or more logical units of the correct size, it picks one of them from among a variety of ways. For example, it is possible to just pick the first appropriate LUNs listed in the LUMT. Additional replication target volume properties other than type and size can be specified here, and the information regarding these properties is passed from the source snapshot module 2025 to the destination snapshot module 3025. Finally, the snapshot module 3025 returns an unused logical unit designation for replicated D'-VOL 3302 or an error to the source snapshot module 2025. The mount operations of replicated snapshot are the same as described in the previous embodiments.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of managing mapping information for creating in a second storage system a replica of a snapshot volume in a first storage system; wherein the first storage system includes a first file system having a first source volume that contains data, and having a second source volume; the method comprising:

storing mapping information of the first source volume and the second source volume in the first storage system;
    copying, in the second source volume, data from files or blocks that were on the first source volume prior to the files or blocks being changed on the first source volume, the data being copied following each predetermined point in time that a snapshot is taken;
    sending to the second storage system, information regarding the first source volume and the second source volume in the first file system;
    receiving from the second storage system information regarding a first target volume in the second storage system and a second target volume in the second storage system, the first target volume receiving replication of the first source volume, the second target volume receiving replication of the second source volume; and
    sending transfer information to the second storage system, the transfer information being provided using the information received from the second storage system, the transfer information including the mapping information of the first source volume and the second source volume and information of the first and second target volumes.

2. A method according to claim 1, further comprising:
    commencing replication of the first source volume from the first storage system to the first target volume in the second storage system;
    commencing replication of the second source volume from the first storage system to the second target volume in the second storage system; and
    creating a replica snapshot volume in the second storage system from the first target volume and the second target volume, as identified from the transfer information.

3. A method according to claim 2, wherein the first storage system includes a snapshot volume created from the first source volume and the second source volume, the method further comprising:
    after replicating the first source volume and the second source volume to the first target volume and the second target volume, respectively, in the second storage system, creating the replica snapshot volume.

4. The method according to claim 2, further comprising:
    storing the transfer information in a second snapshot volume management table in the second storage system; and
    using the transfer information to identify the first target volume as containing a replica of the first source volume and the second target volume as containing a replica of the second source volume, whereby correct volumes to be used for the replica snapshot volume are identified by the second storage system.

5. A method according to claim 1, wherein the mapping information includes a first file system name of the first file system, a source primary volume logical unit number assigned to the first source volume, and a source differential volume logical unit number assigned to the second source volume.

6. A method according to claim 1, further comprising locating the first target volume and the second target volume, wherein the locating includes looking for two unused volumes in the second storage system that satisfy a predefined set of parameters so as to qualify as the first or second target volumes.

7. A method according to claim 6, wherein the predefined set of parameters include type and size of the volume, wherein the first target volume has the same type and size as the first source volume and the second target volume has the same type and size as the second source volume.

8. A system for managing mapping information for replicating a snapshot volume from a first storage system to a second storage system, the system comprising:
    a first source volume and a second source volume in the first storage system, the second source volume storing data copied from files or blocks that were on the first source volume prior to the files or blocks being changed on the first source volume, the data being copied following each predetermined point in time that a snapshot is taken, whereby a snapshot volume of the first source volume at a particular predetermined point in time is created from the first source volume and the second source volume;
    a first destination volume and a second destination volume in the second storage system, the first destination volume storing replication received from the first source volume and the second destination volume storing replication received from the second source volume; and
    a memory in the first storage system storing information including mapping information regarding the first source volume and the second source volume, and corresponding information regarding the first and second destination volumes receiving replication, wherein the second storage system is configured to locate the first destination volume and the second destination volume based on the mapping information regarding the first source volume and the second source volume.

9. A system according to claim 8, wherein the first source volume is replicated to the first destination volume, and the second source volume is replicated to the second destination volume, wherein a replica of the snapshot volume at a specified predetermined point in time is created at the second storage system from the first destination volume and the second destination volume by using the stored information regarding the first and second source volumes and the first and second destination volumes.

10. A system according to claim 9, wherein the first and second source volumes are replicated to the first and second destination volumes, respectively, by a remote copy module located in the first storage system.

11. A system according to claim 9, wherein the first storage system comprises a first network attached storage (NAS) head and a first storage controller, the first NAS head including a first local file system, the first storage controller including a remote copy module which provides remote copy operations to the first storage controller, wherein the second storage system comprises a second NAS head in communication with a second storage controller, the second NAS head including a second local file system, wherein the replica of the snapshot volume is mounted via the second local file system.

12. A system according to claim 8, further comprising a RAID manager at the first storage system which commences a process to locate the first destination volume and the second destination volume by looking for two unused volumes in the second storage system that satisfy a predefined set of parameters so as to qualify as the first or second destination volumes.

13. A system according to claim 12, wherein the predefined set of parameters include type and size of the volume, wherein the first destination volume has the same type and size as the first source volume and the second destination volume has the same type and size as the second source volume.

14. A system for managing mapping information for replicating a snapshot volume from a first storage system to a second storage system, the system comprising:

a first source volume and a second source volume in the first storage system, the second source volume storing data copied from files or blocks that were on the first source volume prior to the files or blocks being changed on the first source volume, the data being copied following each predetermined point in time that a snapshot is taken, whereby a snapshot volume of the first source volume at a particular predetermined point in time is created from the first source volume and the second source volume;

a first destination volume and a second destination volume in the second storage system, the first destination volume storing replication received from the first source volume and the second destination volume storing replication received from the second source volume; and a memory in the first storage system storing information including mapping information regarding the first source volume and the second source volume, and corresponding information regarding the first and second destination volumes receiving replication, wherein the first destination volume is designated; and wherein the second storage system is configured to locate the second destination volume based on the information stored in the memory regarding the first source volume and the first destination volume.

15. A system according to claim 14, wherein the first source volume is replicated to the first destination volume, and the second source volume is replicated to the second destination volume, wherein a replica of the snapshot volume at a specified predetermined point in time is created at the second storage system from the first destination volume and the second destination volume by using the stored information regarding the first and second source volumes and the first and second destination volumes.

16. A system according to claim 15, wherein the first and second source volumes are replicated to the first and second destination volumes, respectively, by a remote copy module located in the first storage system.

17. A system according to claim 15, wherein the first storage system comprises a first network attached storage (NAS) head and a first storage controller, the first NAS head including a first local file system, the first storage controller including a remote copy module which provides remote copy operations to the first storage controller, wherein the second storage system comprises a second NAS head in communication with a second storage controller, the second NAS head including a second local file system, wherein the replica of the snapshot volume is mounted via the second local file system.

18. A system according to claim 14, further comprising a RAID manager at the first storage system which commences a process to locate the second destination volume by looking for an unused volume in the second storage system that satisfy a predefined set of parameters so as to qualify as the second destination volume.

19. A system according to claim 18, wherein the predefined set of parameters include type and size of the volume, wherein the second destination volume has the same type and size as the second source volume.

* * * * *